US006366287B1

(12) United States Patent
Van Vugt

(10) Patent No.: US 6,366,287 B1
(45) Date of Patent: Apr. 2, 2002

(54) DISPLAY DEVICE INCLUDING A CACHE MEMORY HAVING A PLURALITY OF MEMORY SEGMENTS

(75) Inventor: Henricus A. G. Van Vugt, Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/230,556

(22) PCT Filed: May 26, 1998

(86) PCT No.: PCT/IB98/00809

§ 371 Date: Jan. 28, 1999

§ 102(e) Date: Jan. 28, 1999

(87) PCT Pub. No.: WO98/54691

PCT Pub. Date: Dec. 3, 1998

(30) Foreign Application Priority Data

May 28, 1997 (EP) .......................................... 97201568

(51) Int. Cl.[7] .......................... G06F 15/16; G01C 22/00

(52) U.S. Cl. ...................... 345/503; 345/553; 345/573; 701/28

(58) Field of Search ................................ 345/501–503, 345/553, 573; 701/25, 26, 28

(56) References Cited

U.S. PATENT DOCUMENTS

| | | | | | |
|---|---|---|---|---|---|
| 4,876,651 | A | * | 10/1989 | Dawson et al. | 701/200 |
| 4,884,220 | A | * | 11/1989 | Dawson et al. | 345/573 |
| 5,903,281 | A | * | 5/1999 | Chen et al. | 345/504 |
| 5,940,089 | A | * | 8/1999 | Dilliplane et al. | 345/553 |
| 6,023,278 | A | * | 2/2000 | Margolin | 345/419 |
| 6,097,401 | A | * | 8/2000 | Owen et al. | 345/562 |

* cited by examiner

*Primary Examiner*—Ulka J. Chauhan

(57) ABSTRACT

A display device is disclosed that includes a cache memory consisting of memory segments, each memory segment being capable of storing an image fragment. A video generator is driven by a video cache reader, which builds up a screen image from complete or partial image fragments stored in the memory segments. By means of hardware counters and registers the address of an image point in the cache memory is derived from the address of the image point read in last. As a result of this, the screen image can be built up very rapidly, so that no special screen memory is required and the amount of data to be transferred is reduced.

5 Claims, 5 Drawing Sheets

DISPLAY DEVICE INCLUDING A CACHE MEMORY HAVING A PLURALITY OF MEMORY SEGMENTS

The invention relates to a display device for displaying a screen image comprising:

- a first memory which in logic terms consists of at least two segments, each segment being adapted to store an image fragment made up of a plurality of fragment points,
- image-building means for building the screen image from the image fragments or parts of the image fragments stored in the first memory, by consecutively reading a plurality of screen points corresponding to fragment points from the first memory, The invention also relates to a method method of building up a screen image from at least two image fragments, each image fragment being stored in a memory segment which forms part of a first memory, an image fragment being made up of a plurality of fragment points, the display image being built up by consecutively reading a plurality of screen points corresponding to fragment points from the first memory.

Such a display device is known from EP-A 0 341 654. The known device is a map display device for use in an airplane and includes a bulk memory, a random access memory, a display memory, a data bus and a display screen. The bulk memory serves for the digital storage of maps in compressed form. The random access memory serves as a cache memory and is made up of segments capable of storing a random map-fragment in non-compressed form. Logically contiguous fragments then need not be stored in physically contiguous cache segments. The display memory stores the image being displayed on the display screen. If the image is to be changed the display memory is reloaded by composing the image from fragments stored in the cache memory. If a required fragment is not yet available from the cache memory it is read in from the bulk memory. The data bus serves for the transfer of data between the various components.

A disadvantage of the known device is that a special display memory is required and that there is extensive data traffic from the cache memory to the display memory and from the display memory to the screen. As a result of this, high demands are made on the speed of the required processors and the capacity of the data bus.

It is an object of the invention to provide a display device of the type defined in the opening paragraph which does not require a special display memory and which enables the occupancy of the data bus to be comparatively low.

To this end, the device in accordance with the invention is characterized in that the display device further comprises storage means for storing for each first segment pointing information to further segments, the image-building means being adapted to use the pointing information associated with a first segment to find a second segment, when two fragment points corresponding to consecutive screen points are contained in the first and the second segment respectively.

Owing to these measures the screen image can be composed directly from randomly arranged image fragments in the first memory. As long as fragment points are being read from a single segment, the address of a following fragment point can easily be derived from the memory address of the fragment point read in last. When a segment transition is encountered, which would normally cause an unacceptable delay, the segment containing the following fragment point can be located quickly by making use of the pointing information.

As a result of this, a special display memory is not necessary and the occupancy of the data bus is reduced considerably, enabling simpler components to be used or enabling the capacity which has thus become available to be used for other purposes.

The detection of segment transitions can be effected by means of storage registers and counters, preferably implemented in hardware, e.g. the registers containing segment dimensions and the counters being used for counting the number of fragment points read in from a particular segment. An additional advantage is that further process parameters, e.g. the dimensions of the display screen, can be stored in registers as well, thereby giving the designer freedom as regards the choice of components.

An embodiment of the device in accordance with the invention has the characteristic features defined in claim 2. It is customary to build up a line of a screen image by scanning pixels from one end of the line to the other end in a progressive way. If at some point of the screen line a segment transition is encountered, said pointer refers to the second segment which contains succeeding points of the screen line. In this way the scanning process proceeds without a substantial delay.

A further embodiment of the device in accordance with the invention has the characteristic features defined in claim 3. It is customary to build up a screen image by displaying lines from one end of the image to the other end in a progressive way, possibly in multiple cycles (interlaced scan). If at some screen line a segment transition is encountered, said pointer refers to the third segment which contains succeding lines of the screen image. In this way the scanning process proceeds without a substantial delay. A combination with the previous embodiment is very advantageous.

A further embodiment has the characteristic features defined in claim 4. An advantage of this embodiment is that the image in the first memory can also be displayed on the screen in a rotated form. A difference with the embodiment as claimed in claim 2 and claim 3 is that screen lines no longer have the same orientation as fragment lines, as a result of which a logically following screen point may correspond to, for example, a fragment point that forms part of a logically preceding fragment line. In this embodiment the pointing information of each cache segment therefore also comprises references to cache segments which store the logically preceding image fragment in a coordinate direction parallel to or perpendicular to the fragment lines. The projection means could, for example, be adapted to project the distance between two points of a rotated screen line onto said coordinate directions and determine the logically following fragment point by rounding to the nearest one. In a similar way the projection means could be applied in a direction perpendicular to the screen lines, e.g. for determining the fragment point which corresponds to the first point of a logically following screen line, given the fragment point corresponding to the first point of the preceding screen line.

The method in accordance with the invention is characterized in that for each segment pointing information to further segments is stored, using the pointing information associated with a first segment to find a second segment, when two fragment points corresponding to consecutive screen points are contained in the first and the second segment respectively.

These and other aspects of the invention will be described in more detail with reference to an embodiment given by way of example.

FIG. 5 shows for a preferred embodiment a flow chart of a method of determining an address of a fragment point which corresponds to a screen point to be read in.

Figure 1:
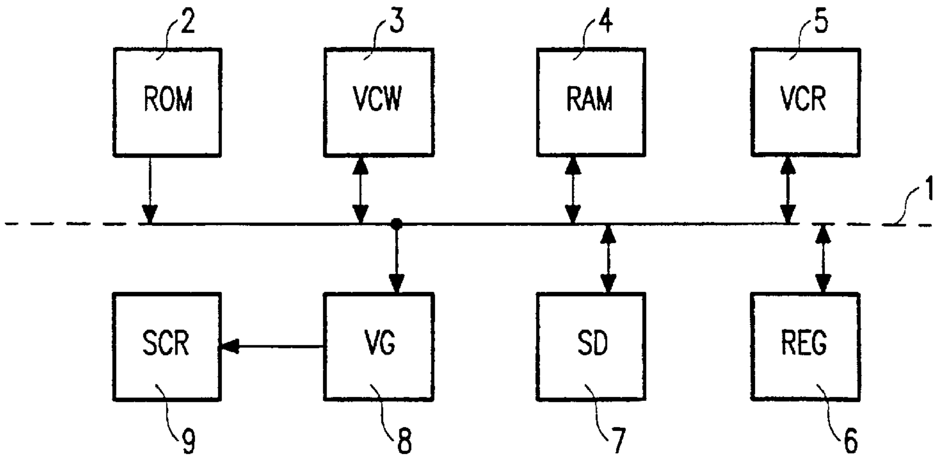
FIG. 1 is a diagram showing an embodiment of the display device in accordance with the invention.

The display device shown in FIG. 1 comprises a data bus 1 for the transfer of digital information between the other components, a bulk memory 2, and a video cache writer 3, which can load video information from the bulk memory 2 (via the data bus 1) and write this information into a cache memory 4. A video cache reader 5 can read video information from the cache memory 4 and transfer this information to a video generator 8. The video generator 8 generates a video signal which can be displayed on a display screen 9. A scroll detector 7 is adapted to detect when image scrolling is desired and to apply scroll information to the video cache writer 3 and the video cache reader 5. Registers 6 can store information required to build up the image.

The display device may form part of a car navigation system, in which case the bulk memory 2 is a CD-ROM which stores a map, if desired in compressed form. Depending on the location of the car, a part of the map is to be displayed on the display screen 9. With the aid of information from the scroll detector 7, the video cache writer 3 ensures that the cache memory 4 always stores the correct part of the map, if necessary after decompression. On the basis of information about the driving direction and driving speed the video cache writer 3 can anticipate a location that is due by already loading given image fragments into the cache memory 4 and removing other image fragments from this memory.

Figure 2:
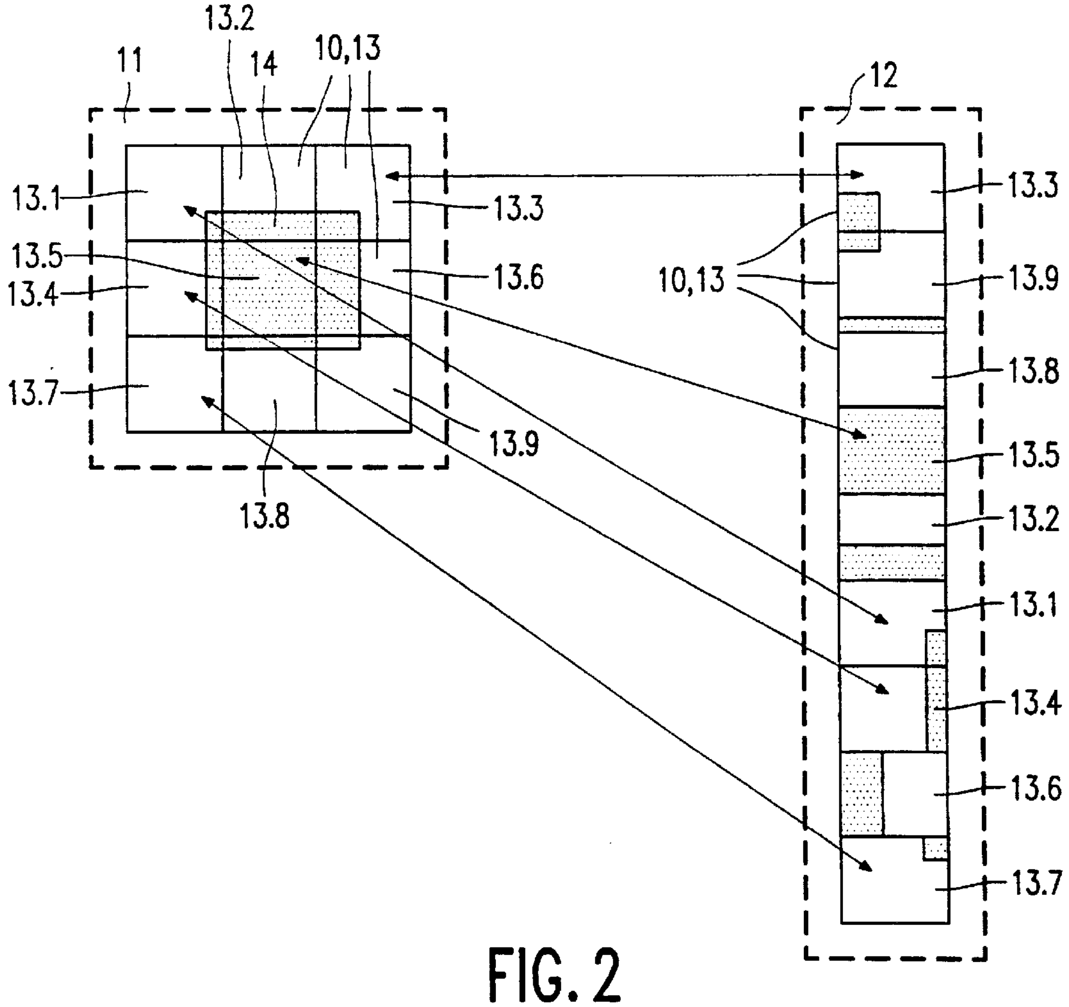
FIG. 2 shows an example of the relationship between the logic content and the physical arrangement of memory segments.

The cache memory 4 comprises a plurality of memory segments which can all store an arbitrary image fragment. As is customary, each image fragment comprises a plurality of fragment lines and each fragment line comprises a plurality of fragment points. The physical arrangement of the memory segments is independent of the logic arrangement of the image fragments stored in them. FIG. 2 gives an example of the relationship between the physical arrangement and the logic content. A logic configuration 11 comprises a screen image 14 made up of at least parts of different image fragments 13.1 through 13.9 stored in cache segments 10. A physical configuration 12 comprises the same cache segments 10 at their physical locations in the cache memory 4. In FIG. 2 all cache segments 10 store an image fragment 13 which wholly or partly forms part of the screen image, but this is not necessary. A cache segment may likewise store an image fragment which does not form part of the screen image, or it may not contain any image fragment at all.

The video cache reader 5 drives the video generator 6 directly rather than, as is customary, via a special buffer memory in which the complete screen image built up from the cache segments 10. As a result, there is neither any data transfer from and to such a video buffer, so that the occupancy of the data bus 1 is reduced considerably. Therefore, it is possible to use simpler components or the capacity which has thus become available can be utilized for other purposes.

Figure 3:
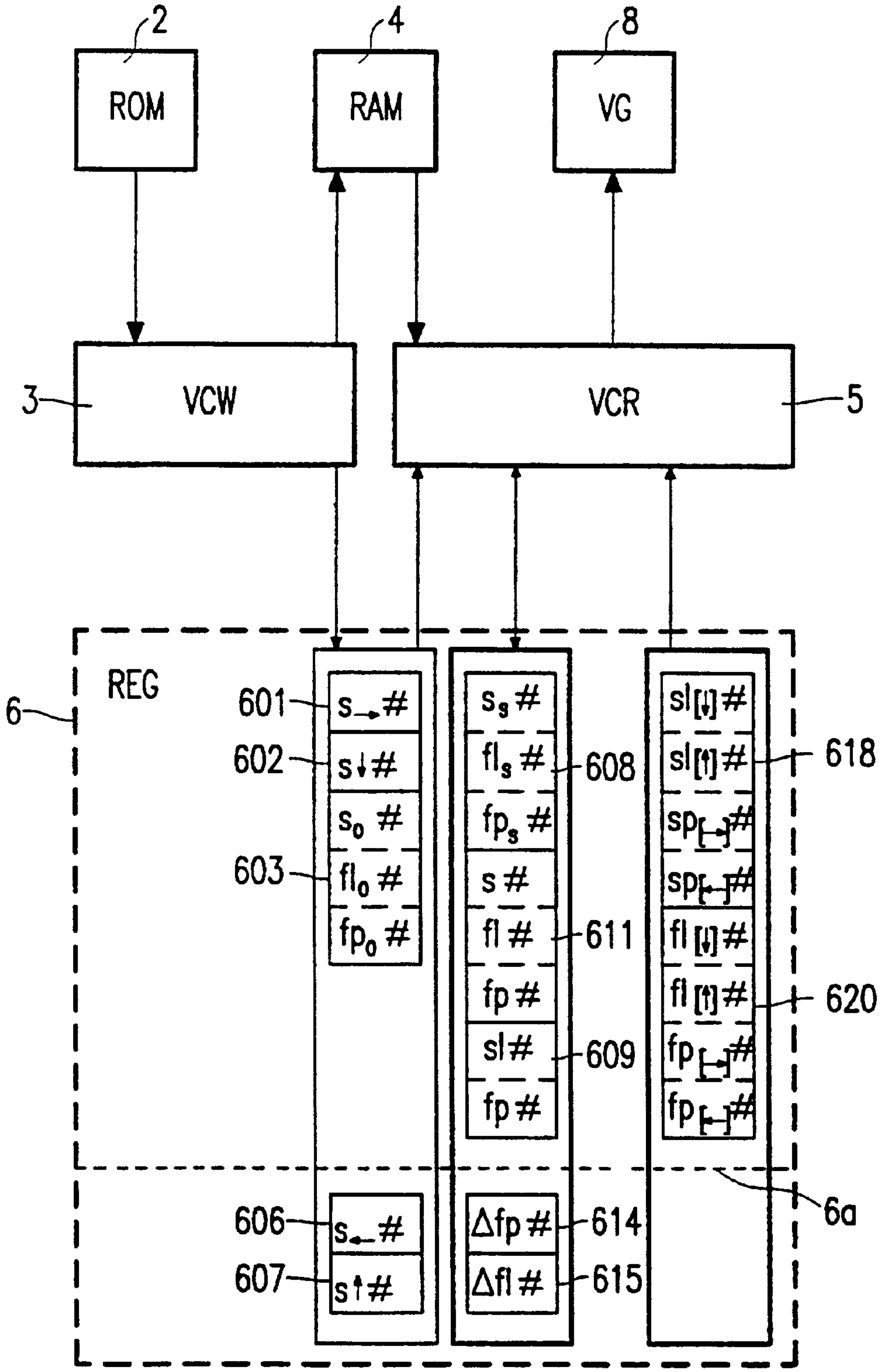
FIG. 3 shows for a preferred embodiment the registers and counters required to build up a screen image and how the registers cooperate with other components of the display device in accordance with the invention.

Building up the screen image 14 from the image fragments 13.1 through 13.9, which are stored in different cache segments 10 at arbitrary locations in the cache memory 4, is effected by means of hardware counters and registers 6, thus enabling this process to be carried out with the required high speed. FIG. 3 shows the registers and counters required to build up the screen image 14 from the image fragments stored in the cache segments 10 in a preferred embodiment and shows how these registers and counters cooperate with other components of the display device shown in FIG. 1. This embodiment comprises at least the following registers, into which the video cache writer 3 can write information:

- Fifth memory registers 601 which for each cache segment store the segment number $s_{\rightarrow}\#$ of a cache segment which stores the following image fragment in a coordinate direction parallel to the fragment lines.
- Sixth memory registers 602 which for each cache segment store the segment number $s_{\downarrow}\#$ of a cache segment which stores the following image fragment in a coordinate direction perpendicular to the fragment lines.
- A fourth memory register 603 stores the address of a fragment point that corresponds to the first screen line, the address comprising a segment number $s_0\#$, a fragment line number $fl_0\#$ and a fragment point number $fp_0\#$.

The video cache reader 5 can read information from the above-mentioned registers and also from the following registers:

- A first memory register 618 for storing the logically first screen line number $sl_{[\uparrow]}\#$, the logically last screen line number $sl_{[\downarrow]}\#$, the logically first screen point number $sp_{[\leftarrow]}\#$ and the logically last screen point number $sp_{[\rightarrow]}\#$.
- A second memory register 620 for storing the logically first fragment line number $fl_{[\uparrow]}\#$, the logically last fragment line number $fl_{[\downarrow]}\#$, the logically first fragment point number $fp_{[\leftarrow]}\#$ and the logically last fragment point number $fp_{[\rightarrow]}\#$.

The video cache reader 5 can further read and write information from/into the following registers:

- A seventh memory register 608 which stores the address $fp_s$ of a fragment point that corresponds to the first screen point of a screen line to be read in, the address $fp_s$ comprising a segment number $s_s\#$, a fragment line number $fl_s\#$ and a fragment point number $fp_s\#$.
- An eighth memory register 609 which stores the screen line number sl# and the screen point number sp# of a screen point to be read in.
- A third memory register 611 which stores the address fp of a fragment point that corresponds to a screen point to be read in and defined by sl# and sp#, the address fp comprising a segment number s#, a fragment line number fl# and a fragment point number fp#.

The image-building means are adapted to determine the address fp(s#, fl#, fp#) of a fragment point that corresponds to a screen point sp(sl#, sp#) to be read in, and the address of the fragment point read in last being equal to $fp_1(s_1\#, fl_1\#, fp_1\#)$, by successively performing the following steps:

```
if (sl# = sl[↑]#) and (sp# = sp[←]#)
then (fp := fp0; fp1 := fp0; fps := fp0)
else (
      fp := fp1;
      if (sp# > sp[←]#)
      then (
            if (fp# < fp[→]#)
            then (fp# := fp→#)
            else (s# := s→#; fp := fp[←]#)
      )
      else (
            fp := fps;
            if (fl# < fl[↓]#)
            then (fl# := fl↓#)
            else (s# := s↓#; fl# := fl[↑]#);
            fps := fp;
      )
)
```

The steps to be carried out are specified in a pseudo-code, steps being grouped by means of parentheses and being separated by means of semicolons. Steps should be carried out in the specified sequence. A value assignment to a variable is indicated by ‘:=’. Conditional execution is specified by means of steps of the form ‘if A then B’ or ‘if A then B else C’, where A is a condition or a list of conditions separated by conjunctions, and where both B and C each comprise at least one step. The ‘=’ operator represents the customary equivalence test. The operators ‘<’ and ‘>’ respectively indicate that the first argument appears logically earlier or later than the second argument. The continuation means are adapted so as to achieve that the result can always be used as an argument of the operators ‘<’ and ‘>’. For example, if the logically following fragment point number does not exist in the current memory segment these operators can be used to determine which segment limit has been exceeded, for example by means of the equation ‘$fp_{\rightarrow}\#>fp_{[\rightarrow]}\#$’.

A fragment point that corresponds to the first screen point of the first screen line is determined in advance and is stored in a register. For all the other screen points the address of the corresponding fragment point is determined by means of information stored in registers during build-up of the screen image.

For screen points which are not the first screen point of a screen line the address of the corresponding fragment points is obtained by copying the address of the fragment point read in last and by subsequently replacing the fragment point number by the logically following fragment point number. If then a segment limit is exceeded the fragment point number is replaced by the logically first fragment point number and the new segment is defined by means of the reference to the logically following segment in a coordinate direction parallel to the fragment lines, which reference has been stored with the current segment.

For screen points which are the first screen point of a screen line the address of the corresponding fragment point is obtained by copying the address of the fragment point that corresponds to the first screen point of the screen line read in last and subsequently replacing the fragment line number by the logically following fragment line number. If then a segment limit is exceeded the fragment line number is replaced by the logically first fragment line number and the new segment is defined by means of the reference to the logically following segment in a coordinate direction perpendicular to the fragment lines, which reference has been stored with the current segment.

In a preferred embodiment a logically following number, for example a logically following fragment line number, is essentially the current number incremented by one. The logically last number is essentially equal to the number of different numbers. This enables the first memory registers 618, the second memory register 620 and the continuation means to be simplified. In the present example it is assumed that screen line numbers range from zero to the number of screen lines #sl, the screen point numbers range from zero to the number of screen points #sp per screen line, the fragment line numbers range from zero to the number of fragment lines #fl, and the fragment point numbers range from zero to the number of fragment points #fp per fragment line.

In the present example the fragment point number $fp_s\#$ is always equal to the fragment point number $fp_0\#$ and the fragment line number can always be derived from the fragment line number fl#, thereby enabling the seventh memory register 608 to be simplified as well.

Figure 4:
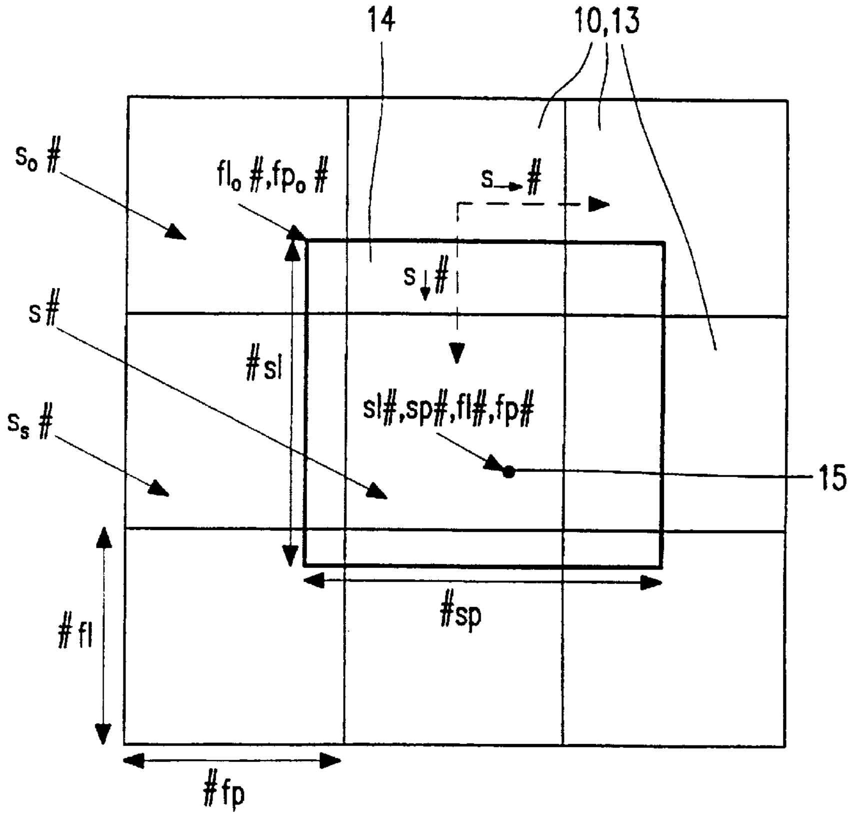
FIG. 4 shows diagrammatically the meaning of the various registers and counters in relation to the screen image and the memory segments.

FIG. 4 shows diagrammatically the meaning of the various data in relation to the screen image 14, the cache segments 10, the image fragments 13 stored therein, and a fragment point 15 to be read in.

The data #sl, #sp, #fl and #fp are permanent and are altered only when the screen or cache configuration changes. When the device is initialized or when the scroll detector 7 indicates that the logic position of the screen image changes with respect to the complete image on the bulk memory 2, any new image fragments are read out of the bulk memory 2 by the video cache writer 3 and are written into the cache memory 4. Subsequently, $s_{\rightarrow}\#$, $s_{\downarrow}\#$, $s_0\#$, $fl_0\#$ and $fp_0\#$ are initialized.

Figure 5:
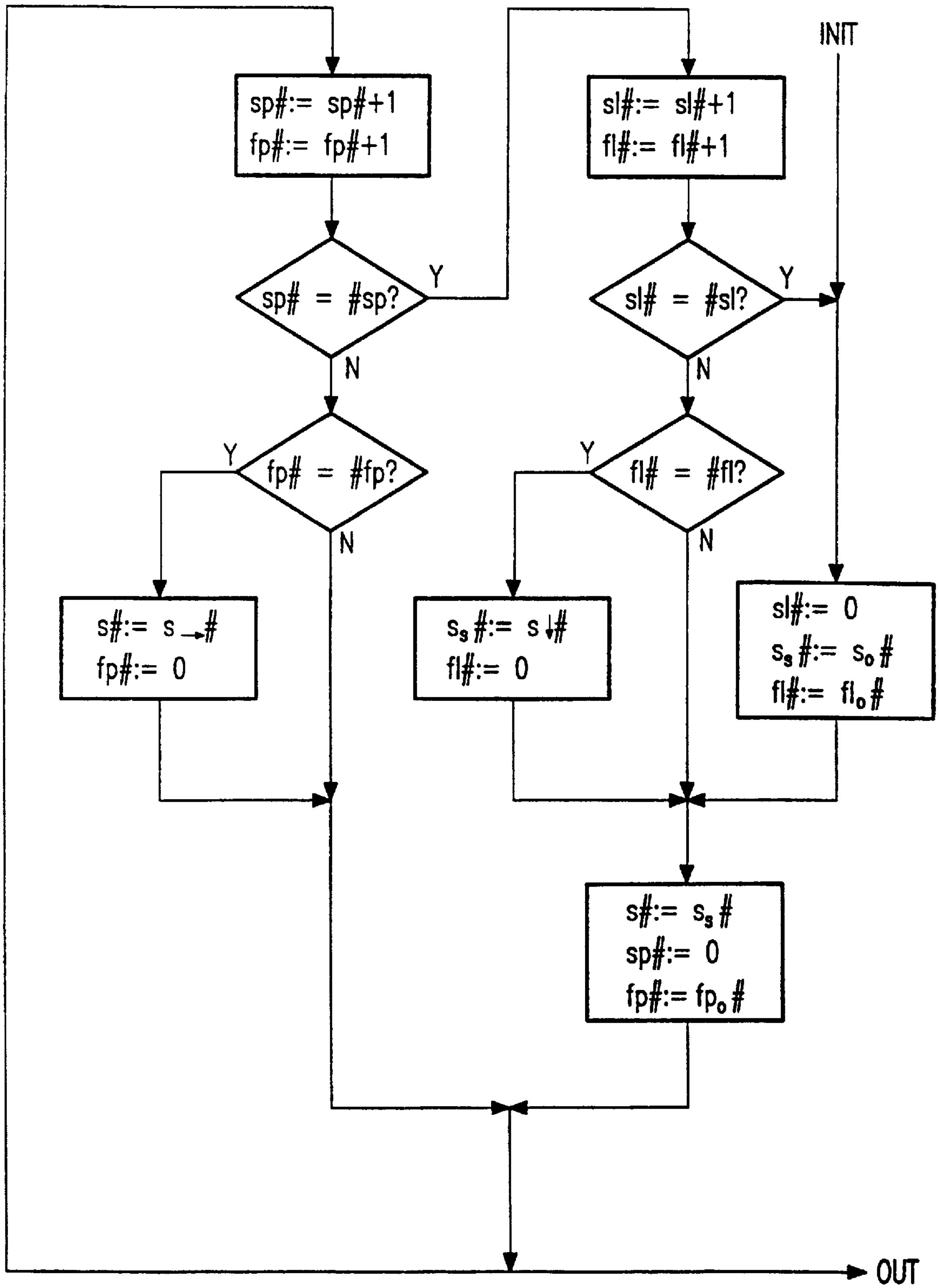

The counters $s_s\#$, sl#, sp#, s#, fl# and fp# are initialized each time that the video cache reader 5 begins to read out the screen image and during the read-out they are adapted in accordance with an algorithm as shown in FIG. 5. In the present embodiment it is assumed that line numbers and point numbers start with 0 and further correspond to following natural numbers. In another embodiment arbitrary but monotonically increasing or decreasing numbers can be chosen, the extreme values $sl[_{\uparrow}]$, $sl[_{\downarrow}]\#$, $fl[_{\uparrow}]\#$ and $fl[_{\downarrow}]\#$ as well as any relative or absolute values being stored registers. Furthermore, this embodiment uses counters with a positive step value and the screen image is read out from left to right and from top to bottom. In another embodiment different choices can be opted for.

The algorithm starts at the point marked ‘INIT’ and is subsequently cycled through for any screen image to be read in. At the point marked ‘OUT’ during each cycle the address becomes available of a fragment point that corresponds to a screen point to be read in. This address is utilized by the video cache reader 5 to read in the fragment point and apply it to the video generator 8.

The address of a fragment point that corresponds to a screen point not being the first one of a screen line is generated from the address of the fragment point that corresponds to the screen point read in last. The fragment line number then remains the same, while the fragment point number is incremented by 1. If now a segment limit is surpassed the fragment point number is given the value 0 and by means of the register $s_{\rightarrow}\#$ associated with the current cache segment the segment number of the cache segment containing the logically following fragment point is determined. At the beginning of a new screen line the segment number is given the value $s_s\#$, the fragment point number is given the value of $fp_0\#$, and the fragment line number is incremented by 1. If the preceding fragment line number had the maximum value the fragment line number is given the value 0 and by means of the register $s_{\downarrow}\#$ associated with the current cache segment the segment number of the cache segment containing the logically following fragment point is determined.

A logically following screen point is determined by incrementing the screen point number by 1. If the maximum screen point number is then reached the screen line number is incremented by 1 and the screen point number is given the value 0. If the maximum screen line number is reached the screen line number and the screen point number are both given the value 0.

In a further embodiment it is also possible to display rotated screen images. For this purpose, the device in accordance with the invention includes a number of additional means and memory registers shown below a broken line 6*a* in FIG. 3:

Eleventh memory registers 606 which for each cache segment store the segment number $s_{\leftarrow}\#$ of a cache segment which stores the logically preceding image fragment in a coordinate direction parallel to the fragment lines.

Twelfth memory registers 607 which for each cache segment store the segment number $s_{\uparrow}\#$ of a cache segment which stores the logically preceding image fragment in a coordinate direction perpendicular to the fragment lines.

A ninth memory register 614 which stores an increment –fp# for the fragment point number.

A tenth memory register 615 which stores an increment –fl# for the fragment line number.

Figure 7:
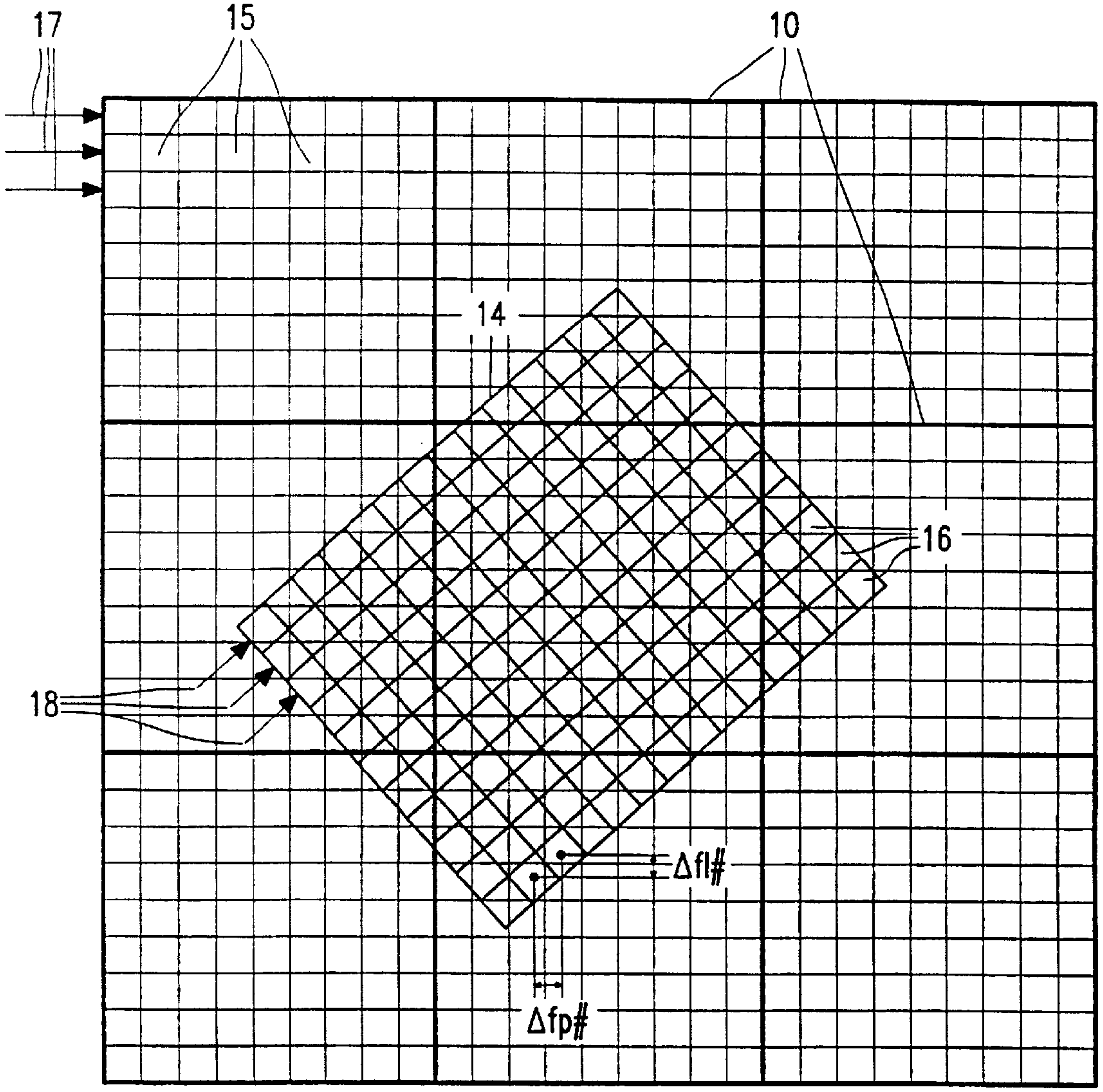
FIG. 7 shows how increments for fragment line numbers and fragment point numbers are defined for an embodiment which is also capable of displaying rotated images.

The present embodiment further includes the following additional means:

The video cache reader 5 includes projection means for determining the increments –fp# and –fl# for a given angle of rotation, as will be explained in detail hereinafter with reference to FIG. 7.

The video cache reader 5 includes rounding means for, after adaptation of a fragment point number by the increment –fp#, determining the nearest fragment point number fp≈# and for, after adaptation of a fragment line number by the increment –fl#, determining the nearest fragment line number fl≈#.

The video cache reader 5 includes address-determining means adapted to determine, with the aid of the projection means and the rounding means, the address $fp_{s\approx}$cf the fragment point that corresponds to the first screen point of a subsequent screen line to be read in.

Figure 6:
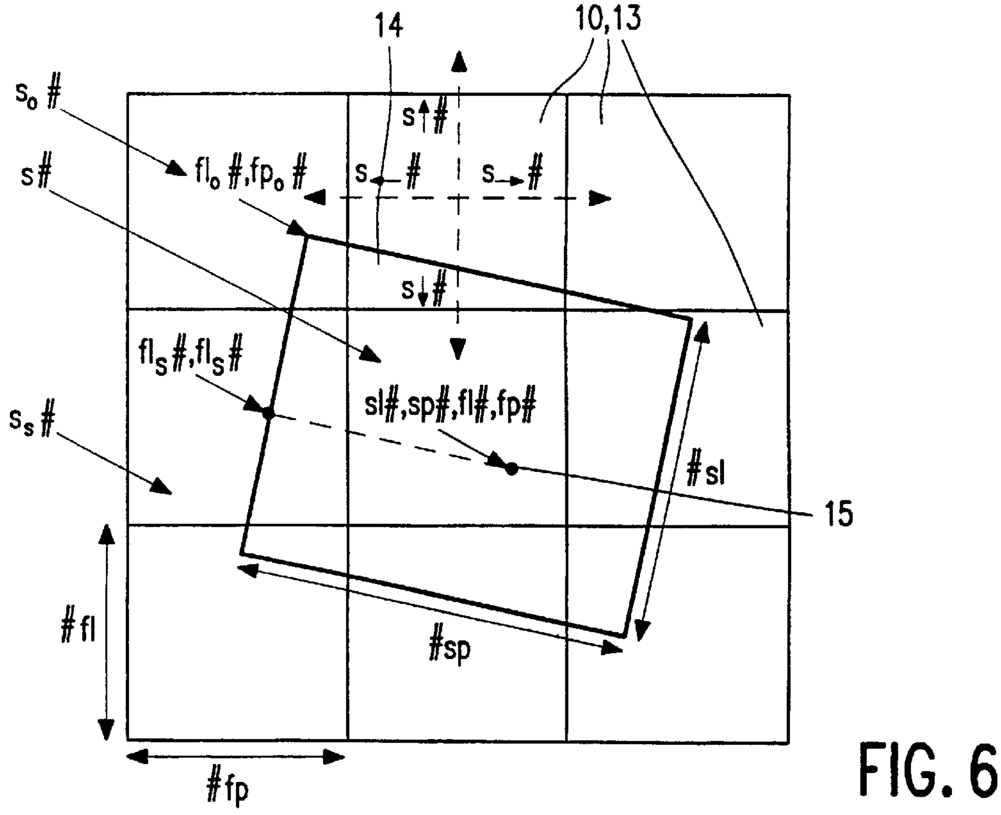
FIG. 6 shows diagrammatically the meaning of the various registers and counters in relation to the screen image and the memory segments for an embodiment which is also capable of displaying rotated images.

The video cache writer 3 can change the data $s_{\leftarrow}\#$ and $s_{\uparrow}\#$. The video cache reader 5 can read the data $s_{\leftarrow}\#$ and $s_{\uparrow}\#$ and can read and change the increments –fp# and –fl#. FIG. 6 shows diagrammatically the meaning of the different registers in relation to the screen image 14, the cache segments 10, the image fragments 13 stored therein, and a fragment point 15 to be read in and a fragment point 16 that corresponds to the first screen point of a screen line which includes the fragment point 15 to be read in.

The address of a fragment point that corresponds to a screen point to be read in and not being the first screen point of a screen line is generated from the address of the fragment point that corresponds to the screen point read in last. The fragment point number is adapted by –fp# and the fragment line number is adapted by –fl#. At segment transitions the adjacent segment numbers are determined by means of at least one of the data $s_{\rightarrow}\#$, $s_{\leftarrow}\#$, $s_{\downarrow}\#$ and $s_{\uparrow}\#$ and, if necessary, the data fl# and fp# are initialized. The address of the fragment point that corresponds to a first screen point of a screen line is formed by the data $s_s\#$, $fl_s\#$ and $fp_s\#$. For determining this address the video cache reader 5 includes address-determining means adapted to determine, with the aid of the projection means and the rounding means, the address $fp_{s\approx}$ of the fragment point that corresponds to the first screen point of a subsequent screen line to be read in. This determination is effected similarly to the determination of an address of a fragment point that corresponds to a subsequent screen point on the same screen line but the angle of rotation is now incremented by 270 degrees. FIG. 7 illustrates how –fp# and –fl# are determined. The rotated screen image 14 is composed of individual screen lines 18 made up of screen points 16 to be imaged at fragment points 15. The line linking the centers of two following screen points 16 of the rotated screen image is projected on two orthogonal coordinate axes, one of the one of the coordinate axes being parallel to fragment lines 17. The value –fp# is equal to the projection on the coordinate axis parallel to the fragment lines 17 and the value –fl# is equal to the projection on the coordinate axis perpendicular to the fragment lines 17. The increments –fp# and –fl# can also be used for determining the address $fp_{s\approx}$ of the fragment point that corresponds to the first screen point of a subsequent screen line to be read in, namely by determining two new increments –fp'# and –fl'# as follows:

–fl'#:=–fp#;

–fp'#:=–fl#;

Subsequently, –fp'# and –fl'# are used for determining the address $fp_{s\approx}$ in the manner described.

In the case of a rotated screen image, the address fp(s#, fl#, fp#) of the fragment point that corresponds to a screen point sp(sl#, sp#) to be read in is determined by successively performing the following steps:

```
if (sl# = sl[↑]#) and (sp# = sp[←]#)
then (fp := fp0)
else (
      fp := fp1;
      if (sp# = sp[←]#)
      then (fp := fps≈; fps := fp);
      else (
            fl# := fl≈#;
            if (fl# < fl[↑]#)
            then (s# := s←#; fl# := fl[↓]#)
            else (if (fl#>fl[↓]#) then (s#:=s→#;fl#:=fl[↑]#));
            fp# := fp≈#;
            if(fp# < fp[←]#)
            then (s# := s↑#; fp# := fp[→]#)
            else (
                  if (fp#>fp[→]#)
                  then (s#:=s↓#;fp#:=fp[←]#)
            );
      );
);
```

The device in accordance with the invention can be extended simply by means for zooming in or zooming out the screen image, if desired in combination with image rotation. For this purpose, it is possible to utilize increments in the manner described but in this case the resultant of the projection vectors is no longer exclusively equal to the distance between two logically following screen points but can arbitrary values within given limits, which values can be smaller as well as greater than said distance. The nearest fragment point is determined again by rounding. The result of this method is that during zooming-out from the original situation logically following fragment points can be skipped during read-in while during zooming-in from the original situation fragment points can be read in several times. At segment transitions tie data fl# and fp# will no longer always assume the logically first or last value but a logically earlier or later value depending on the number of points to be skipped in the relevant coordinate direction and on what part of this number has already been skipped before the relevant segment transition.

In this way it is also possible to realize other effects. For example, distances between image points which in at least one coordinate direction are remoter from an imaginary position can be displayed to a smaller scale in accordance with a predetermined proportionality function, as a result of which a so-termed 'birdview' is obtained. This can be achieved by making the magnitudes of the increments dependent on the position of a screen point to be read in.

Summarizing, the invention relates to a display device comprising a cache memory (4) made up of memory segments, which memory segments can each store one image fragment. A video generator (8) is driven by a video cache reader (5) which forms a screen image from whole or partial image fragments stored in the memory segments. By means of counters and registers the address of an image point in the cache memory (4) is derived from the address of the image point read in last. As a result of this, the screen image can be built up very rapidly, so that no special screen memory is required and the amount of data to be transferred is reduced.

What is claimed is:

1. A display device for displaying a screen image, comprising:

a first memory which in logic terms consists of at least two segments, each segment being adapted to store an image fragment made up of a plurality of fragment points, image-building means for building the screen image from the image fragments or parts of the image fragments stored in the first memory, by consecutively reading a plurality of screen points corresponding to fragment points from the first memory, wherein the display device further comprises storage means for storing for a first segment pointing information to further segments, the image-building means being adapted to use the pointing information associated with a first segment to find a second segment, when two fragment points corresponding to consecutive screen points are contained in the first and the second segment respectively, wherein the image-building means being adapted to build a screen line by consecutively obtaining screen points having a monotonically increasing coordinate number along a point-scan direction, and the pointing information comprises a pointer to a second segment, which second segment comprises fragment points corresponding to screen points of said screen line having higher coordinate numbers along the point-scan direction than screen points corresponding to the fragment points in the first segment, wherein the image-building means being adapted to build the screen image by consecutively building screen lines having a monotonically increasing coordinate number along a line-scan direction, and the pointing information comprises a pointer to a third segment, which third segment comprises fragment lines corresponding to screen lines having higher coordinate numbers along the line-scan direction than screen lines corresponding to the fragment lines in the first segment, and wherein the pointing information comprises a pointer to a fourth segment, which fourth segment comprises fragment points corresponding to screen points of said screen line having lower coordinate numbers along the point-scan direction than screen points corresponding to the fragment points in the first segment, and a pointer to a fifth segment, which fifth segment comprises fragment lines corresponding to screen lines with lower coordinate numbers along the line-scan direction than screen lines corresponding to the fragment lines in the first segment, the display device further comprising projection means adapted to use said pointing information for determining, for a given angle of rotation of the screen image and for a given screen point, a fragment point which corresponds to a screen point succeeding the given screen point along the point-scan direction or succeeding the given screen point along the line-scan direction.

2. A display device as claimed in claim 1, the image-building means being adapted to build the screen image by consecutively building screen lines having a monotonically increasing coordinate number along a line-scan direction, characterized in that the pointing information comprises a pointer to a third segment, which third segment comprises fragment lines corresponding to screen lines having higher coordinate numbers along the line-scan direction than screen lines corresponding to the fragment lines in the first segment.

3. A display device as claimed in claim 1, characterized in that the device also comprises a second memory for storing the complete image, the first memory functioning as a cache memory.

4. A display device as claimed in claim 1, characterized in that the image is a map or plan.

5. A car navigation system including a display device as claimed in claim 1.

* * * * *